United States Patent [19]

Goss, Jr. et al.

[11] Patent Number: 4,644,748

[45] Date of Patent: Feb. 24, 1987

[54] CONSTANT SPEED HYDRAULIC DRIVE

[75] Inventors: Reginald J. Goss, Jr., Grafton; Gary S. Jendrzejek, Milwaukee, both of Wis.

[73] Assignee: The Oilgear Company, Milwaukee, Wis.

[21] Appl. No.: 728,822

[22] Filed: Apr. 29, 1985

[51] Int. Cl.⁴ ............................................. F16D 31/02
[52] U.S. Cl. ........................................ 60/395; 60/468; 60/494
[58] Field of Search ................. 60/395, 468, 494, 445, 60/448; 91/458; 417/218

[56] References Cited

U.S. PATENT DOCUMENTS

| | | | |
|---|---|---|---|
| 3,274,768 | 9/1966 | Klein | 60/448 X |
| 3,438,201 | 4/1969 | Nash et al. | 60/395 |
| 3,635,021 | 1/1972 | McMillen et al. | 417/222 X |
| 4,103,489 | 8/1978 | Fletcher et al. | 60/395 |

Primary Examiner—Edward K. Look
Attorney, Agent, or Firm—T. Lloyd La Fave; Thomas W. Ehrmann

[57] ABSTRACT

A constant speed hydraulic drive comprising a variable displacement hydraulic pump controlled to maintain a constant flow of hydraulic fluid even though a prime mover therefor is subject to speed variations. The constant flow rate delivered by the hydraulic pump is at a rate sufficient to drive a load hydraulic motor at a predetermined speed when the load hydraulic motor is subject to any given load. A pilot operated relief valve proportionally bleeds hydraulic fluid from ahead of the hydraulic motor in accordance with the speed and load of the hydraulic motor. And an electrical means provides a varying control signal to the pilot operated relief valve which is responsive to the total pulse error between those representative of motor speed and a predetermined speed to provide a first speed command signal greater than the predetermined speed, and a second speed command signal which modifies the first speed command signal by the difference in the actual speed from the first speed command signal, whereby the speed of the hydraulic motor is maintained at the predetermined speed.

7 Claims, 3 Drawing Figures

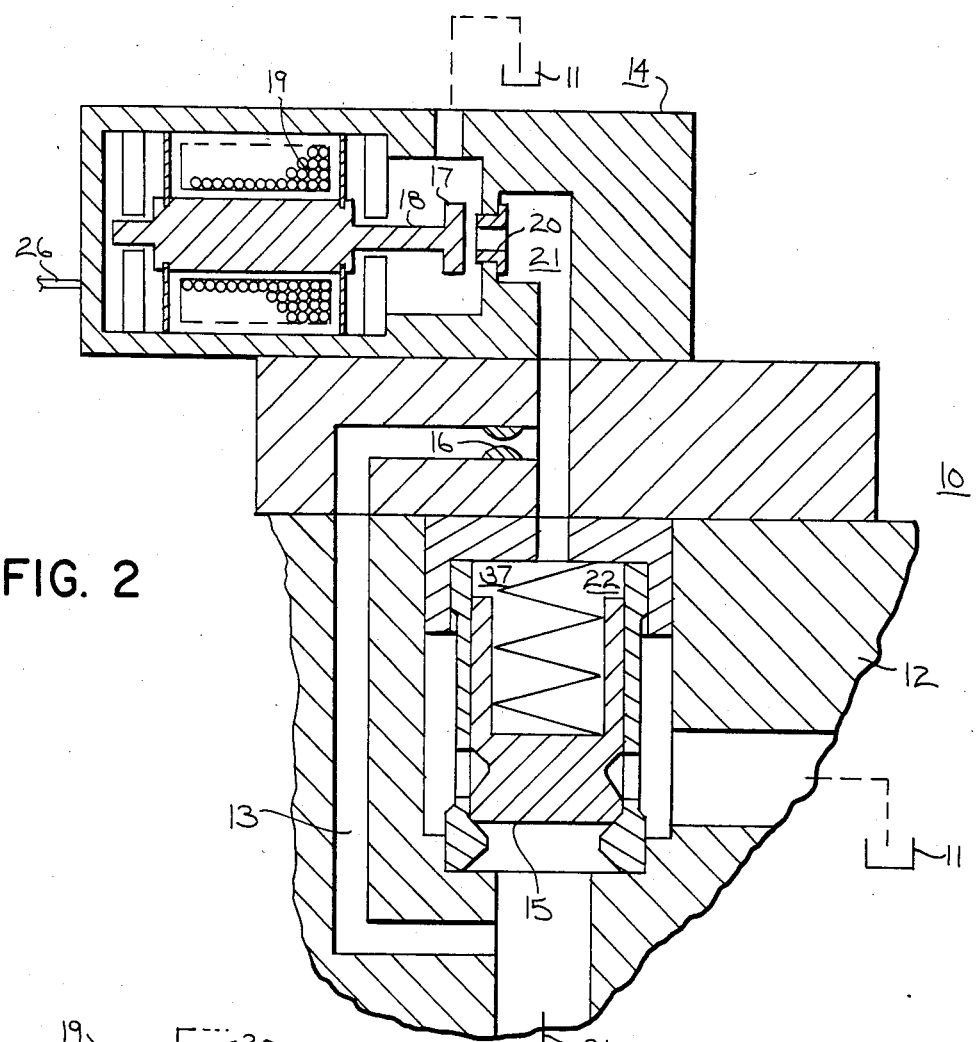
FIG. 2
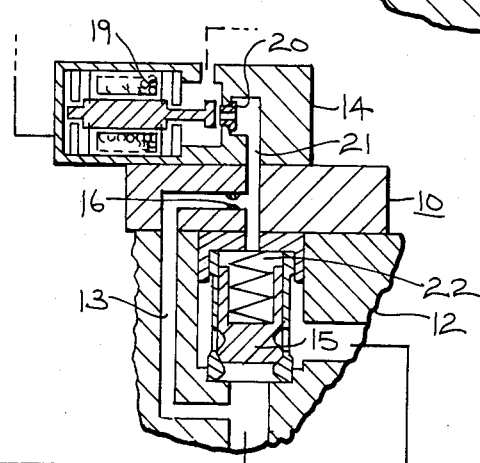
FIG. 3
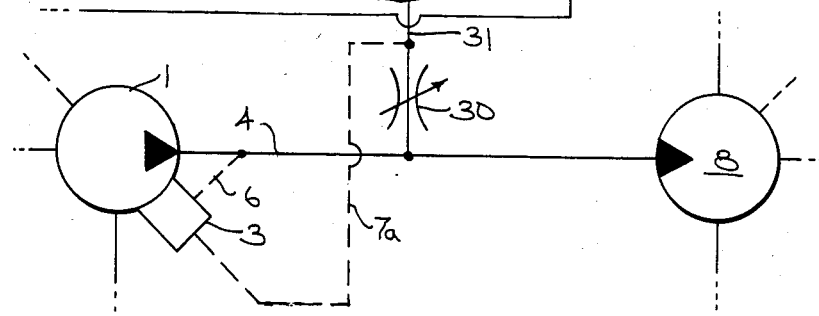

CONSTANT SPEED HYDRAULIC DRIVE

BACKGROUND OF THE INVENTION

The invention is particularly suited for an application in the field where the prime mover for the constant speed hydraulic drive is an internal combustion engine whose speed is throttle controlled and where the prime mover is a multi-purpose engine subject to variations in speed and loading imposed by the hydraulic drive and also to other loading as well. A particular application for this constant speed hydraulic drive is to drive a generator whose output frequency must be maintained constant. Loading of the generator may also be subject to variations.

Prior art servo control systems using feedback devices to control the output of the pump to maintain the speed of a hydraulic motor constant are inherently slower in response time and are subject to some oscillation and instability with respect to maintaining the speed of the hydraulic motor finitely constant. Servo feedback systems controlling the pump stroke to control motor speed encounter delay in response time due to compressibility of the hydraulic fluid. Motor acceleration when required is delayed because a portion of pump delivery is used to compress the fluid to be delivered to the hydraulic motor, so the servo commands the pump to even greater stroke. The reverse of this problem occurs during deceleration of the hydraulic motor. The servo feedback system in adjusting to overspeed and underspeed of the hydraulic motor encounters oscillations and instability of the speed of the hydraulic motor.

THE INVENTION

The invention relates to a constant speed hydraulic drive, that avoids delay in response and instability due to compressibility of the hydraulic fluid. Thus, this constant speed hydraulic drive maintains the speed of its hydraulic motor finitely constant by providing faster response time without oscillations and instability in maintaining a constant motor speed.

The invention utilizes a variable dispacement hydraulic pump whose displacement is controlled to maintain a constant rate of flow of motive fluid regardless of variations in speed of a prime mover, sufficient to drive a fixed displacement hydraulic motor at a predetermined speed when the hydraulic motor is at a predetermined load, and utilizes a relief valve to bleed hydraulic fluid from ahead of the hydraulic motor to maintain its speed at a predetermined speed. The relief valve is controlled to bleed an amount of fluid varying in a certain proportion in response to a value of an electric current to a coil on a pilot valve for the relief valve.

Hold down forces on the relief valve include line pressure admitted to the back of the relief valve through a flow restriction. The pressure on the back of the relief valve also acts upon the pilot valve urging it an open direction. The electric current to the coil of the pilot valve urges the pilot valve in a closed direction dependent on the value of the electric current. When the hold down pressure on the relief valve overcomes the hold down force on the pilot valve, the pilot valve proportionally opens to drain fluid from behind the relief valve and the relief valve proportionally opens to bleed motive fluid from ahead of the hydraulic motor. The resulting function is one where the pilot valve throttles fluid from behind the relief valve, and in turn causes the relief valve to throttle and bleed fluid from ahead of the motor, all proportionately to the value of the electric current to the coil of the pilot valve.

The value of this electric current varies as speed and load conditions vary. The value of this electrical current is determined and provided by an electrical pulse generating and sensing means which first compares the actual number of pulses generated by the motor to a fixed constant pulse rate standard and adds a signal corresponding to the difference in total pulses to a predetermined speed signal resulting in a first speed command signal. The speed sensing means also provides a signal corresponding to the actual speed of the hydraulic motor which is compared with the first command signal to provide a second or final speed command corresponding to the difference between the first speed command signal and the signal corresponding to the actual speed of the hydraulic motor. Thus, the value of the first command signal gradually increases with increasing load as the total pulse error increases each time the load is increased and the generator falls further behind in total pulses generated. This total pulse error is summed with the fixed command forming the first speed command; and the first amplifier delivers a signal, increasing in proportion to increasing load, to the second amplifier.

The second amplifier also receives a signal corresponding to the actual speed of the hydraulic motor. As the actual speed of the hydraulic motor approaches the predetermined speed, the second amplifier receives two (2) opposing signals. As the load increases, the difference between the actual speed of the hydraulic motor and the first speed command becomes larger, thereby generating an increasingly large error signal which is amplified and sent to the proportional pressure pilot valve to supply it with a signal whose value increases in proportion to generator loading. The function is such as to maintain the pilot valve throttling just enough to maintain the speed of the hydraulic motor constant at the predetermined speed.

Since the final speed command signal is obtained by adding the first speed command signal to the actual speed signal within the second amplifier, it is equivalent to multiplying the speed error signal by a factor such as two. The factor of the error signal remains constant but the error signal increases as the generator load increases, becoming a maximum at maximum generator load and becoming a minimum at minimum generator load.

Thus, the bleed rate effected by the proportional pressure pilot valve depends not only on the magnitude of the speed error signal, but also depends on whether the speed error signal reflects overspeed or underspeed. Overspeed requires an increase in the rate of bleeding of motive fluid from ahead of the hydraulic motor, and underspeed requires a decrease in the bleed rate, in effect adding motive fluid to the hydraulic motor.

THE OBJECTS OF THE INVENTION

It is an object of the invention to provide a constant speed hydraulic drive regardless of variations in the speed of the prime mover.

Another object of the invention is to provide a constant speed hydraulic drive having a variable displacement pump controlled to maintain a constant rate of flow delivered by the pump.

Another object of the invention is to provide a means to bleed hydraulic fluid from ahead of the hydraulic motor at rates sufficient to maintain the actual speed of the hydraulic motor at a predetermined speed.

Another object of the invention is to provide a constant speed hydraulic drive having a control that is not sensitive to delay in response due to compressibility of the hydraulic fluid.

Another object of the invention is to provide a constant speed hydraulic drive having an internal combustion engine as a prime mover, a variable displacement pump with a sensing control that maintains the rate of flow delivered by the pump at a constant rate, a fixed displacement hydraulic motor receiving motive fluid from the pump, and a pilot operated proportional relief valve to bleed motive fluid from ahead of the hydraulic motor instantly and proportionaly as increasing generator load increases hydraulic motor slip or leakage in proportion to increasing pressure.

Another object of the invention is to provide a constant speed hydraulic drive wherein a pump delivers a constant rate of flow of motive fluid, bleeding an amount of motive fluid from ahead of a hydraulic motor in accordance with a motor speed sensing control that provides a first speed command signal that commands a speed greater than a predetermined speed by the amount of the total pulse error, and a second or final speed command signal which is obtained by comparing the actual speed of the hydraulic motor with the first speed command signal. The resulting speed control signal to the proportional pressure pilot valve commands the hydraulic motor to a somewhat higher than desired speed. Knowing that due to the inherent error of the speed sensing means the final motor speed will be lower than the commanded speed by the amount of the inherent error and hence will be equal to the actual desired speed.

THE DRAWINGS

FIG. 1 is a schematic circuit embodying the present invention of a constant speed hydraulic drive shown coupled to a generator for driving it at a constant speed; the hydraulic drive comprises a variable displacement hydraulic pump with a sensing control to maintain pump delivery at a constant rate, a proportional pressure pilot valve controlling a pressure relief valve that is connected ahead of a fixed displacement hydraulic motor to bleed more or less motive fluid delivered by the pump, and an electronic control shown as comprising an encoder along with a microprocessor and frequency to voltage converter to generate signals corresponding to the actual speed of the hydraulic motor, a fixed reference signal corresponding to a predetermined speed, and means summing the signals to deliver a current to the pilot valve corresponding to a multiple of the difference in the actual speed of the hydraulic motor from the final speed command.

FIG. 2 is an enlarged view in section showing the pilot valve and the relief valve.

FIG. 3 is a modification of a portion of the schematic circuit shown in FIG. 1 having the flow restriction in the line to the relief valve.

DESCRIPTION

Figure 1:
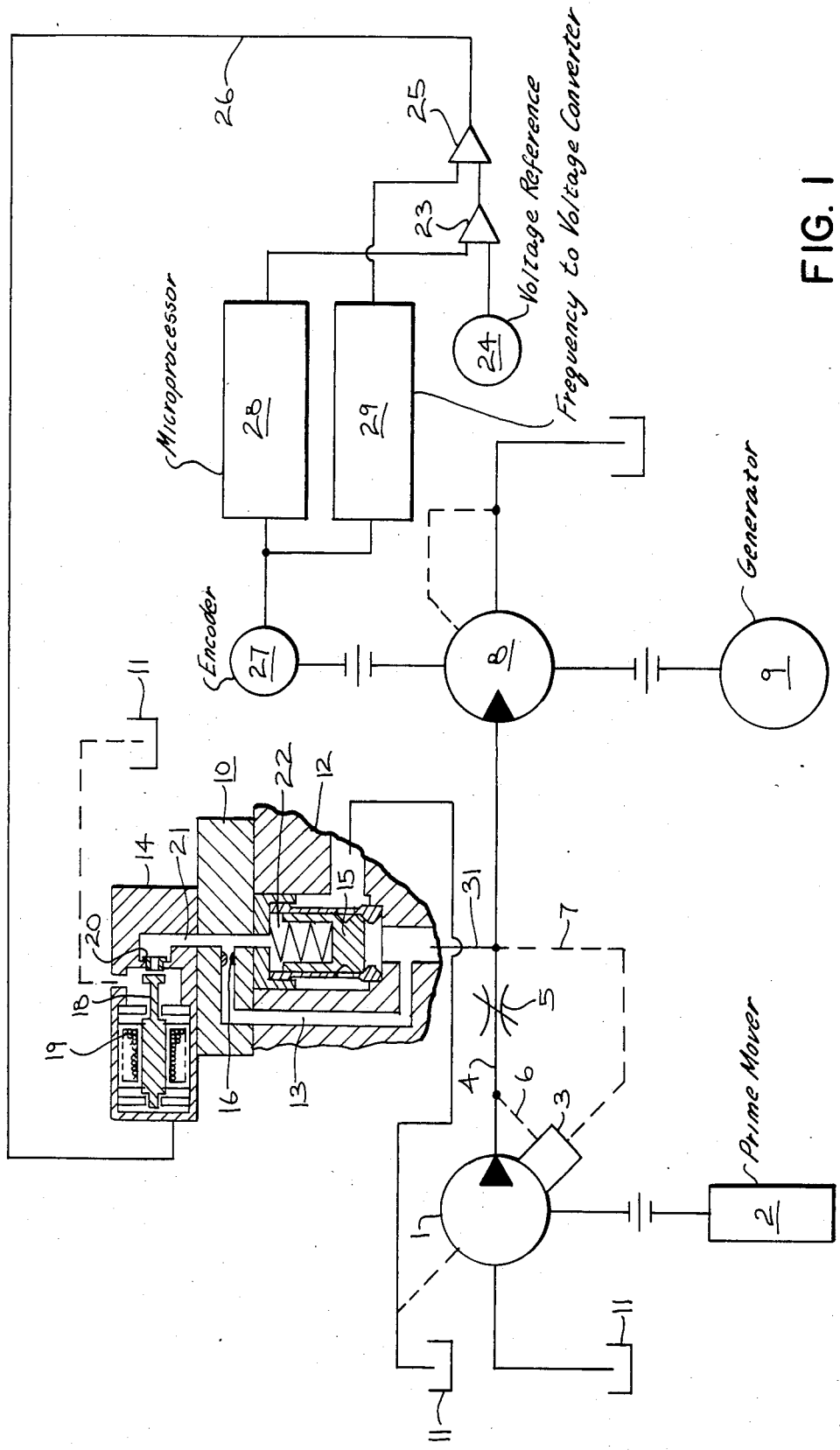

A constant speed hydraulic drive shown in FIG. 1 comprises a variable displacement hydraulic pump 1 driven by a primer mover 2 such as an internal combustion engine. A stroke control for the pump 1 includes a load sensing constant flow control 3 responsive to the drop in pressure across a variable orifice 5 in a line 4 from the pump, by means of a line 6 ahead of the orifice 5 and a line 7 behind the orifice 5, which are connected to the constant flow pump control 3. Dependent on the setting of the variable orifice 5, the rate of flow of motive fluid delivered by the pump 1 is maintained constant at a predetermined value, regardless of variations in the speed of the prime mover 2, or the hydraulic pressure delivered by pump 1. The constant rate of flow provided by pump 1, by means of its control 3, automatically compensates for fluid delivery lost to pump slip as the pump pressure increases.

The pump 1 delivers motive fluid via line 4 to a fixed displacement hydraulic motor 8 that is coupled to drive a load device 9 such as a generator 9.

A pilot operated relief valve 10 is connected to the motive line 4, between orifice 5 and the hydraulic motor 8. The relief valve is operable to bleed more or less fluid from ahead of the hydraulic motor 8 and return it to a tank or reservoir 11.

The pilot operated relief valve 10 comprises a relief valve 12 and a pilot valve 14. The relief valve has line pressure applied to a lift area of its plunger 15 and also, through a passage 13 and a flow restriction orifice 16, to a hold down area 22 of the plunger 15. The hold down forces, which include the force of a spring 37, exerted on the plunger 15 are normally greater than the lift forces on the plunger 15 so the relief valve normally remains closed.

The pilot valve 14 is mounted on the relief valve 10. The pilot valve has a plunger 18 having a direct current coil 19 energized to urge a pilot 17 of the plunger 18 against a valve seat 20. The valve seat 20 is open to a passage 21 to the hold down end chamber of the relief valve 12. The hold down pressure behind the relief valve also acts on the pilot end 17 of the pilot valve to unseat the pilot against the forces exerted by the d.c. coil 19 on the plunger 18. When the pilot valve is operative, it throttles fluid from behind the relief valve, reduces its hold down pressure so the opposing pressure on the lift area of the plunger 15 of the relief valve is then relatively greater, so that the relief valve opens to throttle motive fluid from line 4 ahead of the motor 8.

The force exerted on the pilot plunger 18 varies with the value of the electric current through the d.c. coil 19. Electronic means is employed to determine the value of the electronic current. Such electronic means is responsive to a factor of the difference in the actual speed of the hydraulic motor 8 and a first speed command.

The electronic means includes a reference signal provided by a fixed voltage source 24 corresponding to a predetermined speed of the hydraulic motor and to digital signal means converted to analog voltages corresponding to the actual speed of the hydraulic motor. For this purpose, an encoder 27 is driven by the hydraulic motor 8 and delivers, for example, 256 pulses per revolution. These pulses are fed into a microprocessor 28 and also to a frequency to voltage converter 29.

The microprocessor 28 includes within it an oscillator, not shown, that provides a digital signal corresponding to a predetermined speed of the hydraulic motor. It is noted that the oscillator generates pulses at the same rate as does the encoder 27 when the hydraulic motor 8, which drives the encoder, is rotating at the desired or predetermined speed. It is the number of pulses from the encoder that varies with its speed and the speed of the motor 8. The microprocessor 28 includes the pulse signal of the oscillator.

The microprocessor 28 keeps track of the number of pulses generated by both the encoder 27 and the oscillator relative to each other. The processor samples this information during discreet regularly spaced sampling intervals. During each sampling interval, the processor keeps track of any deviation in the number of these encoder and oscillator pulses and stores in memory a total of such deviation pulses, which reflects a total pulse error, i.e., how many pulses the generator 9 is ahead or behind the predetermined speed reflected by the oscilator.

An analog voltage "error" signal proportional to this total pulse error is generated by the microprocessor 28, which signal is updated at discreet sampling intervals by the microprocessor.

This error voltage is fed to a first amplifier 23. The first amplifier 23 also receives a reference voltage from the fixed voltage reference source 24. The first amplifier 23 sums the voltage signals to it from the microprocessor 28 and the fixed voltage reference source 24. The first amplifier 23 in turn delivers a voltage, denoted as a first command signal, to a second amplifier 25; this voltage corresponds to the sum of the voltage signals to the first amplifier. The sum of such voltage signals to the first amplifier 23 corresponds to the sum of the predetermined speed signal of the hydraulic motor 8 (or generator 9) and the total pulse error provided by the microprocessor 28, which pulse error reflects what has happened to the speed of the motor 8 (or generator 9) and the fixed pulse rate of the oscillator.

The frequency to voltage converter 29 converts the digital signal from the encoder to an analog voltage proportional to the speed of the hydraulic motor, and this voltage is fed to the second amplifier 25.

The second amplifier 25 sums the voltages to it from the first amplifier 23 or a first so called speed command and from the frequency to voltage converter 29. The second amplifier 25 delivers an electric current via lines 26 to the coil 19 of the pilot valve, which current varies proportionately with the difference in the actual speed of the hydraulic motor 8 and the first speed command. The second amplifier thus delivers a second or so called final speed command which is an electrical current to the coil 19 of the pilot valve 14.

The value of the electric current supplied by the second amplifier is actually proportional to a multiple of the difference between the actual speed of the motor and the first speed command signal. While the multiple remains constant, the final speed command varies, increasing as hydraulic motor load increases.

Using the relief valve to bleed fluid from ahead of the hydraulic motor is quick acting and not dependent or subject to any delay as would otherwise be encountered when a feedback system is used to control the stroke of the pump in response to the speed of the motor 8.

As the error voltage approaches zero, the control causes the hydraulic motor to slow down, again resulting in an increased error signal causing the pilot valve control to speed up the hydraulic motor 8. What happens is that the error signal does reach a minimum value by adding the error voltage from the microprocessor to the fixed preset command voltage before it is compared with the actual speed of the hydraulic motor 8.

The proportional pressure pilot valve 14 requires a voltage to it at all times in order to function properly, since if it has no voltage input, is assumes the normally open position and causes the relief valve 12 to remain open connecting motive fluid line 4 to resevoir 11. There is always, however, at least a finite value of voltage provided by the second amplifier 25, because there is always a finite difference in the magnitude of signals to the second amplifier because there is always a difference between the desired speed of hydraulic motor 8 and the first speed command.

With an increasing load on generator 9, and therefore on motor 8, the speed error increases and the total pulse error also increases; and when the total pulse error is added to the fixed rpm command, the first speed command, of amplifier 23, increases by the same amount as does the speed error so that the motor 8 or generator 9 is commanded to an increasingly higher speed, but this increasing speed command is exactly offset by the inherent increase in speed error so that the generator 9 and motor 8 is maintained at the desired constant speed such as 1800 rpm.

In the operation of the constant speed hydraulic drive, the variable flow restricting orifice 5 between the pump 1 and the motor 8 is set to obtain a predetermined constant flow of motive fluid from pump 1. For example, if the hydraulic motor 8 is to be fully loaded, the orifice 5 is set so the pump maintains a rate of flow sufficient to drive the motor 8 at full load.

Since the pump control responds to the flow rate through orifice 5, it maintains a constant flow rate regardless of variations in the speed of the prime mover 2.

If the predetermined speed of the motor 8 is 1800 rpm at 1800 rpm the speed sensing electronic means will deliver a value of electric current which is proportional to generator load. The control is sensitive to finitely control the speed of the hydraulic motor.

In this control system, the relief valve throttling position is changed very slightly, something it does instantly in about 10 milliseconds. It avoids the time lag encountered in a speed control dependent on changing the stroke of the pump.

In FIG. 1, the relief valve is connected directly by line 31 to motive line 4 between a variable flow restriction orifice 5 and the motor 8. In a modification thereof, shown in FIG. 3, the variable flow restriction is not located in motive line 4, but a variable flow restriction orifice 30 is located in line 31. In both, line 7 or 7a respectively to the flow control 3 serves to measure the pressure drop across the flow restriction orifice 5 or 30. An advantage of using an orifice 30 in line 31 is that only the bleed-off oil flowing through the relief valve passes through the orifice 30, whereas the entire volume of motive fluid delivered by pump 1 passes through the orifice 5. Use of orifice 30 results in generation of less heat and, therefore, of less cooling required for the oil. The function of the system of FIG. 1 and FIG. 3 are otherwise the same.

We claim:

1. A constant speed hydraulic drive comprising a variable displacement hydraulic pump with a load sensing control to maintain a constant rate of flow of fluid delivered by said pump, a fixed displacement hydraulic motor receiving motive fluid from said pump, said constant rate of flow of fluid being sufficient to drive said motor at a predetermined load, a pilot operated pressure relief valve operative to bleed fluid from ahead of said motor, a pilot valve for said relief valve being urged open by pressure of said motive fluid and being urged closed by an electromechanical force proportional to the value of the electric current to a control element of said pilot valve, and electronic speed sensing means responsive to the speed of said motor to deliver said electric current having a value proportional to the load imposed on said hydraulic motor.

2. A constant speed hydraulic drive as described in claim 1 wherein the speed sensing means delivers said electric current having a value which is a multiple of the difference between a first speed command and the actual speed of said motor.

3. A constant speed hydraulic drive as described in claim 2 including a flow restriction orifice in a line leading from said line of motive fluid to said relief valve to control the rate that said relief valve bleeds motive fluid from ahead of said motor.

4. A constant speed hydraulic drive comprising a variable displacement hydraulic pump, a fixed displacement hydraulic motor subject to variable loads, a flow restriction in a line of motive fluid between said pump and said motor, a stroke control on said pump responsive to a pressure drop across said flow restriction operative to maintain a constant rate of flow of fluid delivered by said pump sufficient to drive said motor at a predetermined speed, a pilot operated relief valve connected to said motive line ahead of said motor, the pilot of said relief valve is biased toward open position by the pressure in said motive line and is biased toward closed position proportional to a value of an electric current to a coil in said pilot valve, and electronic speed sensing means delivering said electric current proportional to a multiple of the difference between the speed of said motor and said predetermined speed, whereby said relief valve is operative to maintain the speed of said motor at said predetermined value.

5. A constant speed hydraulic drive comprising a variable displacement hydraulic pump with a load sensing control to maintain a constant rate of flow of fluid delivered by said pump, a fixed displacement hydraulic motor receiving motive fluid from said pump, a pressure relief valve operative to bleed motive fluid from ahead of said motor, said pressure relief valve having a pilot valve with a pilot control responsive proportionally to the value of an electric current to said pilot control, and means providing said electric current comprising: a fixed voltage reference signal corresponding to a predetermined speed for said motor, a voltage signal corresponding to the actual speed of said motor, and an amplifier receiving said voltage signals and delivering the electric current to said pilot control in proportion to the difference in the value of said voltage signals.

6. A constant speed hydraulic drive comprising a variable displacement hydraulic pump with a rate of flow sensing control to maintain a constant rate of flow of fluid delivered by said pump, a fixed displacement hydraulic motor receiving motive fluid from said pump, a pressure relief valve operative to bleed motive fluid from ahead of said motor, said pressure relief valve having a control element responsive proportionally to the value of an electric current to said control element, and means determining the value of said electric current comprising: a pulse signal that varies with the speed of the hydraulic motor, an oscillator generated pulse signal indicative of the predetermined speed of the hydraulic motor, and means to convert the difference in said pulse signals to a first analog voltage corresponding thereto, said first analog voltage is added to a fixed reference voltage corresponding to a predetermined speed resulting in a first command voltage indicative of a speed greater than said predetermined speed; a frequency signal indicative of the speed of the hydraulic motor, means converting said frequency signal to a second analog voltage, and means comparing said second analog voltage with said first analog voltage to provide said electric current in accordance with the difference in said second analog voltage and said first analog voltage.

7. A constant speed hydraulic drive comprising a variable displacement hydraulic pump with a flow sensing control to maintain a constant rate of flow of fluid delivered by said pump, a fixed displacement hydraulic motor receiving motive fluid from said pump, a pressure relief valve operative to bleed motive fluid from ahead of said motor, said pressure relief valve having a pilot control responsive proportionally to the value of an electric current to said pilot control, and means providing said electric current comprising: a fixed voltage reference signal corresponding to a predetermined speed of said motor and connected to a first amplifier; a digital signal having pulses which correspond to the actual speed of said motor, a microprocessor that compares said digital signal with an oscillator generated digital signal corresponding to said predetermined speed for said motor to deliver an analog voltage signal to said first amplifier, said first amplifier summing the voltage signals to it and delivering a speed command voltage to a second amplifier, a frequency to voltage converter also receiving a digital signal corresponding to motor speed and delivering an analog voltage to said second amplifier, said second amplifier summing said voltages to it from said first amplifier and from said frequency to voltage converter and delivering to said pilot control an electric current proportional to the difference in the speed of the motor from the speed command voltage delivered by the first amplifier.

* * * * *